R. W. MARTIN.
VARIABLE SPEED DEVICE.
APPLICATION FILED OCT. 23, 1913.
1,115,000.
Patented Oct. 27, 1914.
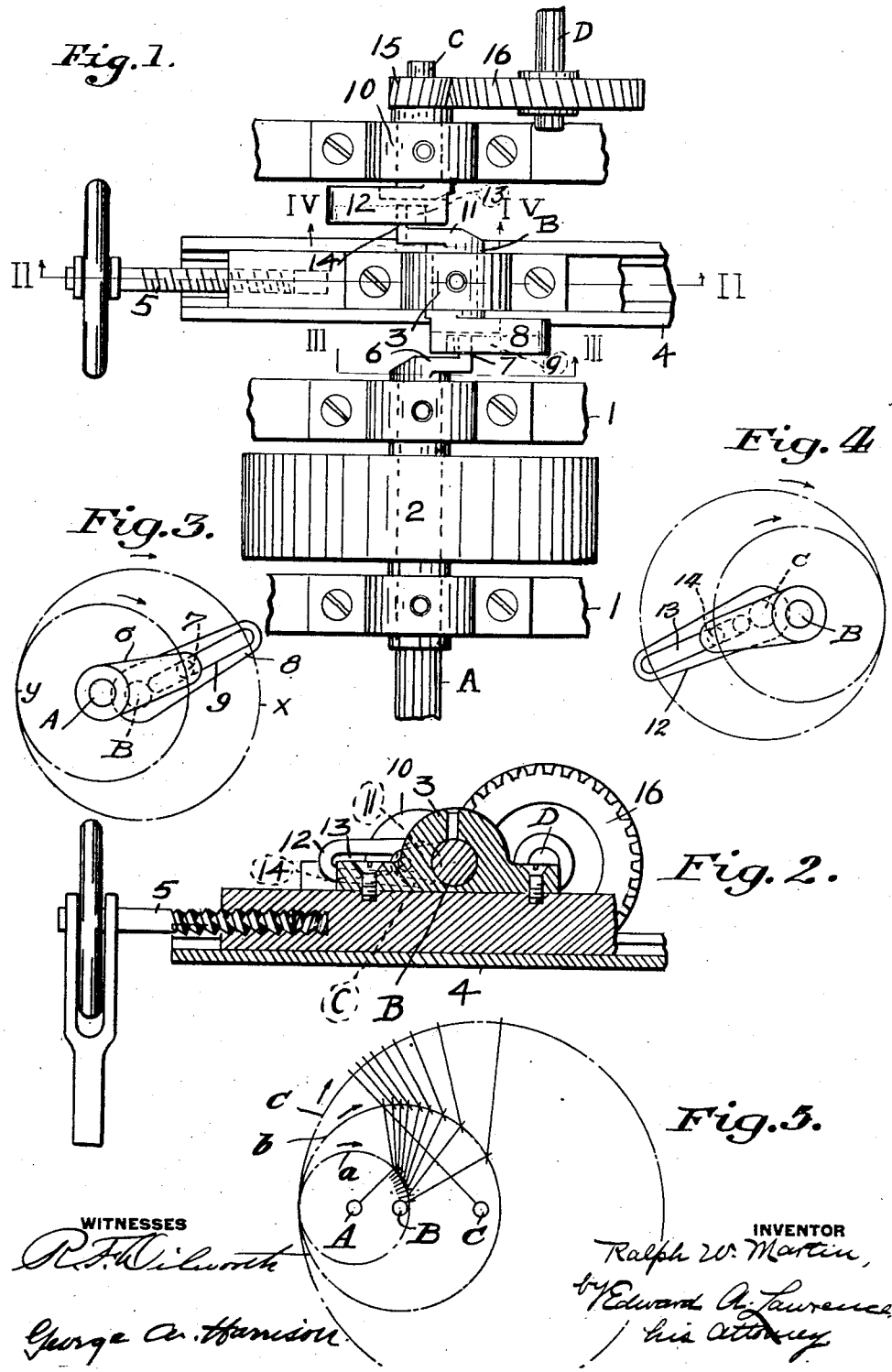

UNITED STATES PATENT OFFICE.

RALPH W. MARTIN, OF BELLEVUE BOROUGH, PENNSYLVANIA.

VARIABLE-SPEED DEVICE.

1,115,000.     Specification of Letters Patent.     Patented Oct. 27, 1914.

Application filed October 23, 1913. Serial No. 796,755.

*To all whom it may concern:*

Be it known that I, RALPH W. MARTIN, a citizen of the United States, and residing in the borough of Bellevue, in the county of Allegheny and State of Pennsylvania, have invented or discovered new and useful Improvements in Variable-Speed Devices, of which the following is a specification.

My invention comprises new and useful improvements in variable speed devices.

Mechanical movements for producing rotation at varying speed are useful in many arts, as for instance in connection with moving-picture cameras and projectors where variable or intermittent motion is to be imparted to the shutter and film feed control.

The objects which I have in view are to provide new and improved means for changing constant rotary motion to variable rotary motion; for compounding or increasing such variations, and for adjusting said variations to meet different requirements. I accomplish the ends in view by the provision of a power shaft, preferably power-driven, and rotating at constant speed, operatively connected by crank mechanism with a second shaft parallel with but not in alinement with the power shaft. The rotary movement imparted to the second shaft is variable, the range of variation being controlled by the distance between the axial planes of the two shafts. Therefore, to change the range of variation, I provide means for shifting said second shaft laterally. To compound or increase the variation in rotary movement, obtained as above described, I may provide a third shaft, in a plane parallel with said second shaft and preferably in alinement with said power shaft. Crank connection between said second and third shaft, similar to that connecting the first shaft with the second shaft, is provided thus rotating the third shaft from the second shaft but compounding in the case of the third shaft the variation in rotation imparted to the second shaft. If it be not desired to change the range of variation obtained, the second shaft need not be made shiftable. By providing additional shafts, similarly connected in series, the compounding of the variability may be indefinitely repeated, the range of variation being changeable by the use of laterally shiftable shafts where required.

In the accompanying drawings, Figure 1 is a plan view showing my invention embodied in a train of three shafts operatively connected together, the intermediate shaft being laterally shiftable; Fig. 2 is a cross-section along the line II—II in Fig. 1; Fig. 3 is a diagrammatic view taken along the line III—III in Fig. 1 showing the crank connection between the power-driven and the intermediate shaft; Fig. 4 is a similar view along the line IV—IV in Fig. 1 showing the crank connection between the intermediate and the third shaft, the intermediate shaft being shown in the same position as in Fig. 3, and Fig. 5 is a diagrammatic view illustrating the variation obtained by the mechanism shown in Fig. 1.

The following is a detailed description of my invention as the same is illustrated in the drawings, the latter being merely illustrative of the principles of my invention and not intended to limit the scope of the same to the construction shown.

A represents the initial or power shaft which rotates at constant speed. Said shaft is mounted as in stationary housings 1 and is preferably provided with a fly-wheel 2 to insure constant movement.

B is a second shaft mounted in housing 3 and in a plane parallel with that of shaft A but not in alinement therewith. The housing 3 is preferably shiftable so as to vary at will the distance between the planes of the two shafts. This may be accomplished by mounting said housing 3 to slide on a bed 4 and adjustable to any position on said bed by means of a screw 5.

The end of shaft A is provided with a crank 6 having on its end the wrist-pin 7. The adjacent end of shaft B is provided with a radial arm 8 having therein a longitudinal slot 9 in which the wrist-pin 7 works.

The operative connection just described is clearly illustrated in Fig. 3. It is evident that the constantly rotating shaft A will thus impart to the shaft B a rotary motion of varying speed, the speed of shaft B being controlled by the position of the wrist-pin 7 in the slot 9. As the wrist-pin travels toward the outer end of arm 8, the speed of rotation of the shaft B decreases but said speed increases or accelerates as said wrist pin travels along said slot toward the axis of shaft B, the rotary speed of the wrist-pin 7 being always constant. Thus when the arm 8 is approaching the point $x$ in Fig. 3, the speed of the shaft B is being accelerated, but as the said arm approaches the point *y* the speed of said shaft decreases. The direction of rotation is indicated by the arrow. It is also evident that the range of variation of speed imparted to shaft B is controlled by the distance apart of the axial lines of the two shafts A and B. As this distance is increased, the range of variation increases and as said distance decreases, said range decreases, so that if the two shafts be brought into alinement, the shaft B would rotate at constant speed. Therefore to alter or adjust said range of variation, I properly position the housing 3 on the bed 4 by means of screw 5, thus being enabled to adjust the range of variation to a great nicety. In Fig. 1 I have shown said shaft B shifted to its extreme position distant from shaft A but it will be understood that the range of adjustment may be increased as desired or needed, limited only by the range of movement of housing 3 and the length of arm 8 and its slot 9 and of the crank 6. If it be desired to compound or increase the variation imparted, as described, to shaft B, I may provide a third shaft C, in a plane parallel with that of shaft B and preferably in alinement with shaft A. 10 is the housing in which said shaft C is mounted. The adjacent end of shaft B is provided with a radial crank 11.

12 is a radial arm on the adjacent end of shaft C provided with a longitudinal slot 13 in which works a wrist-pin 14 on the end of crank 11.

The connection between the crank 11 and the arm 12 is shown in Fig. 4. The crank 11 on the one end of shaft B is diametrically opposite to or 180° from the arm 8 on the other end of said shaft B, and therefore when the crank 6 and arm 8 are in their positions shown in Fig. 3, the crank 11 and arm 12 are in the positions shown in Fig. 4.

It is evident that the shaft C will be rotated by the shaft B and that the variations imparted to shaft B will be compounded in shaft C. If the shafts A and C be in alinement, the cranks 6 and 11 will be of the same length and the arms 8 and 12 and their slots 9 and 13 will be respectively of the same length.

In Fig. 5 I have shown diagrammatically the variations in speed thus obtained. The inner circle *a* represents the rotation of shaft A; the next larger circle *b* represents the rotation of shaft B, while the largest circle *c* represents the rotation of the shaft C. The arcs marked upon the circle *a* represent units of movement of the shaft A, said units being equal as the speed is constant. Radial lines extend from said units to the corresponding units of movement on the circle *b*, illustrating the acceleration of the rotary movement of shaft B, while the radial lines extending from the units on circle *b* illustrate the corresponding acceleration of rotation of the shaft C.

To connect the mechanism to the devices to which power is to be imparted, I may provide the last shaft in the train with a gear wheel 15 meshing with a second gear 16 mounted on the main shaft D of said device which is to be operated at variable speed.

It is evident that if no change in the range of variations be required, the housing of the intermediate shaft may be made stationary. It is also evident that by providing a series of shafts, operatively connected on the principles shown, the variation may be increased indefinitely, and by the interposition of shafts capable of lateral shift, said variations may be changed as to their range as may be found desirable.

What I desire to claim is—

In a variable speed device, a power-driven shaft adapted to rotate at constant speed; a second shaft in alinement with said power-driven shaft but spaced therefrom; an intermediate shaft parallel with but out of alinement with said above mentioned shafts; a variable speed crank connection between said power-driven shaft and said intermediate shaft; a variable speed crank connection between said intermediate shaft and said second shaft; and means for shifting said intermediate shaft laterally in parallelism with said first mentioned shafts whereby the range of speed variation imparted to said second shaft may be adjusted as desired.

Signed at Pittsburgh, Pa., this 21st day of October, 1913.

RALPH W. MARTIN.

Witnesses:
 A. W. FORSYTH,
 E. A. LAWRENCE.